UNITED STATES PATENT OFFICE.

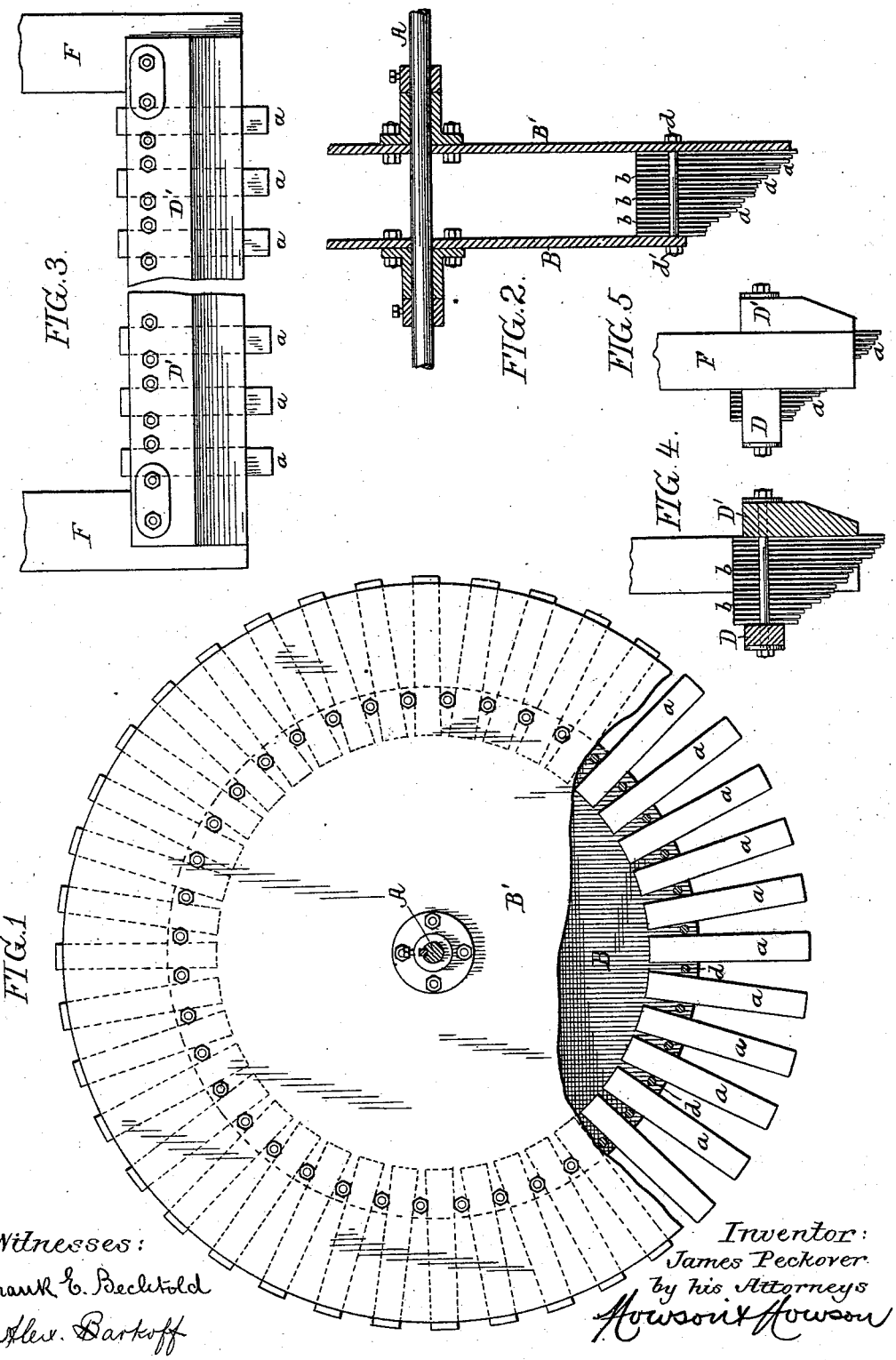

JAMES PECKOVER, OF HARRISBURG, PENNSYLVANIA.

STONE-MOLDING DEVICE.

SPECIFICATION forming part of Letters Patent No. 532,696, dated January 15, 1895.

Application filed June 30, 1892. Serial No. 438,513. (No model.)

*To all whom it may concern:*

Be it known that I, JAMES PECKOVER, a subject of the Queen of Great Britain and Ireland, and a resident of Harrisburg, Dauphin county, Pennsylvania, have invented certain Improvements in Stone-Molding Devices, of which the following is a specification.

The object of my invention is to construct an effective form of tool for molding stone when the cutting operation is effected by the action of sand and water or equivalent abrading material, and this object I attain in the manner hereinafter set forth, reference being had to the accompanying drawings, in which—

Figure 1, is a side view, partly in section, of a rotary molding tool constructed in accordance with my invention. Fig. 2, is a transverse section of part of the tool. Fig. 3, is a side view of part of a reciprocating molding tool constructed in accordance with the invention. Fig. 4, is a transverse section of said tool; and Fig. 5, is an end view of the same.

The tool shown in Fig. 1 comprises a shaft A to which are secured by keys, or in any other suitable manner, opposite circular plates or disks B, B', between which are clamped a series of sets of steel or other metal blades $a$ with intervening packings $b$, the disks being secured together preferably between each set of blades by means of transverse bolts $d$ and nuts $d'$, or by means of bolts and keys or equivalent fastenings.

The blades of each set are adjusted so that their outer ends conform to the shape of the molding which is to be produced so that when the outer ends of the blades are brought into contact with the surface of the stone they will cause the sand and water or other abrading material to act upon the stone and reduce the same to a contour corresponding with that of the outer ends of the blades, the fact that there are spaces between the blades of each set as well as between the sets of blades insuring the free access of the abrading material to every part of the surface which is being acted upon by the blades so that the rapid and effective reduction of said surface to the desired shape will be effected.

In applying my invention to a reciprocating tool the same arrangement of spaced sets of blades and spaced blades in each set is adhered to, the blades being clamped between the front and rear bars or plates D, D', and the latter being secured at the ends to the upright bars or posts F of the frame of the tool so that the latter can be reciprocated in the same manner as a stone cutting saw.

The disk or plate B' is of larger diameter than the disk or plate B and the clamping bar or plate D' is of greater depth than the bar or plate D so as to provide for the confining of the blades $a$ close to their acting ends when the ends of said blades are disposed on a bevel, as shown in Figs. 3 and 4, but when the blades are differently disposed, the bars or plates may be changed accordingly.

In an organized machine the tool may be mounted so as to rotate in suitable bearings and may be combined with suitable devices for feeding water and sand or other abrading material thereto.

When the tool reciprocates the stone is preferably stationary, the tool acting in the same manner as the usual gang saw.

Having thus described my invention, I claim and desire to secure by Letters Patent—

The combination in a stone molding tool, of opposite bars or plates, a series of sets of thin metal blades arranged between said bars or plates so as to provide spaces between the successive sets, packing strips between the adjoining blades of each set forming spaces between said adjoining blades, whereby free access of abrading material to every part of the surface is provided, and means for rigidly clamping the bars or plates together with the blades between them, whereby the latter can have no independent movement, substantially as specified.

In testimony whereof I have signed my name to this specification in the presence of two subscribing witnesses.

JAMES PECKOVER.

Witnesses:
GEO. W. CUNKLE,
JNO. A. HERMAN.